United States Patent [19]

Farr

[11] Patent Number: 6,020,702
[45] Date of Patent: Feb. 1, 2000

[54] SINGLE PHASE COMPRESSOR THERMOSTAT WITH START RELAY AND MOTOR PROTECTION

[75] Inventor: James B. Farr, Ann Arbor, Mich.

[73] Assignee: Tecumseh Products Company, Tecumseh, Mich.

[21] Appl. No.: 09/224,664

[22] Filed: Dec. 31, 1998

Related U.S. Application Data

[60] Provisional application No. 60/071,237, Jan. 12, 1998.

[51] Int. Cl.$^7$ .............................. H02H 7/08; F25B 49/02; G05D 23/24
[52] U.S. Cl. ......................... 318/434; 318/471; 318/782; 388/903; 388/934; 361/23; 361/90
[58] Field of Search ..................................... 318/430, 431, 318/434, 471, 484, 727, 778, 781, 782; 388/903, 921, 934; 361/23, 24, 28, 29, 30, 90, 91, 92, 102, 106; 62/129, 132, 157, 158

[56] References Cited

U.S. PATENT DOCUMENTS

| | | | |
|---|---|---|---|
| 3,742,303 | 6/1973 | Dageford | 361/22 |
| 3,946,574 | 3/1976 | Portera | 62/158 |
| 4,045,973 | 9/1977 | Anderson et al. | 62/158 |
| 4,281,358 | 7/1981 | Plouffe et al. | 361/22 |
| 4,413,672 | 11/1983 | Sidebottom | 165/209 |
| 4,510,547 | 4/1985 | Rudich, Jr. | 361/22 |
| 4,747,009 | 5/1988 | Gillett et al. | 361/165 |
| 4,912,936 | 4/1990 | Denpou | 62/158 |
| 5,463,874 | 11/1995 | Farr | 62/126 |
| 5,491,978 | 2/1996 | Young et al. | 62/126 |
| 5,534,760 | 7/1996 | Jung | 318/442 |
| 5,537,834 | 7/1996 | Farr | 62/126 |
| 5,784,232 | 7/1998 | Farr | 361/22 |

*Primary Examiner*—Bentsu Ro
*Attorney, Agent, or Firm*—Baker & Daniels

[57] ABSTRACT

The present invention involves a refrigeration system. The refrigeration system comprises an electrical compressor motor, a line adapted to be connected to an electrical power line and a thermostat control circuit. The thermostat control circuit comprises a thermostat responsive logic circuitry coupled to a temperature sensor associated with the compressor and a solid state motor control circuit. The solid state motor control circuit includes a relay circuitry, power switch circuitry, compressor starting circuitry with an overload timer, high voltage protection circuitry, under voltage protection circuitry and run current limiting circuitry. The relay circuitry includes an optical coupler and triac to provide line voltage to the compressor through a start resistor. The power switch circuitry includes a pair of SCR's connected in parallel as a switch to allow current to flow through the compressor. The overload timer comprising a resistor and capacitor masks the run circuit limiting circuitry during the compressor starting period for about one second. The run current limiting circuitry includes two voltage comparators arranged in parallel to monitor positive and negative parts of the AC current flow through the compressor. Voltage reference circuitry provides a supply voltage and a reference voltage. The reference voltage circuitry includes an AND gate which regulates the supply voltage. The voltage reference circuitry also includes a zener diode to serve as a precise reference for the reference voltage. The high voltage protection circuitry, the under voltage protection circuitry and the run current limiting circuitry share the same reference voltage.

20 Claims, 2 Drawing Sheets

SINGLE PHASE COMPRESSOR THERMOSTAT WITH START RELAY AND MOTOR PROTECTION

CROSS REFERENCE TO RELATED APPLICATIONS

This application claims the benefit under Title 35, U.S.C. §119(e) of U.S. Provisional patent application Ser. No. 60/071,237, entitled SINGLE PHASE COMPRESSOR THERMOSTAT WITH START RELAY AND MOTOR PROTECTION, filed on Jan. 12, 1998.

BACKGROUND OF THE INVENTION

1. Field of the Invention.

The present invention relates to control circuits for refrigeration systems such as air conditioners, heat pumps, and refrigerators. More specifically, the field of the invention relates to such control circuits for such systems having a single phase compressor.

2. Description of the Related Art.

Motor control and protection devices for electric motors generally include electro-mechanical or solid state electronic devices for activating and deactivating the electric motor based on various operating conditions and the loading on the electric motor. Generally, the motor protection devices sense the current in the motor and interrupt current to the motor when the current exceeds a predetermined threshold.

A method of interrupting the current in the event of an over current condition uses a snap disc placed in series with the windings of the compressor motor. The snap disc is composed of bimetallic layers which are in physical contact with the contact points which close the circuit. Typically, a resistive heating element which heats the bimetallic layers is connected in series with the contact point such that when the heat generated by current passing through the resistive element exceeds a predetermined threshold, the different metals of the bimetallic layer expand at different rates, causing the disc to bend and break the connection to the contact points. Another arrangement involves placing the snap disc device in close proximity to the motor so that the snap disc device may open and close in response to the temperature of the compressor motor.

However, the snap disc arrangement includes a number of disadvantages including: long actuation delay from the time the over current condition occurs and the time the snap disc interrupts the current, imprecise set points, non-dynamic response, inability to account for different environments or motor load conditions, and long restoration time until the snap disc returns to the original condition and re-establishes electrical contact.

Other methods of controlling current to an electric motor include using solid state devices which permit or interrupt current from an AC power source to the motor. Control circuits using such devices have the advantage of precision, reliability and self-regulation. Along with such arrangements, it is advantageous to inductively couple the control circuit with the power output stage. The power output stage regulates the application of power to the motor. Such inductive coupling provides the benefit of electrical isolation of the control logic circuit and the power output circuit thereby reducing the effect of noise in the system. One method of inductive coupling the control circuit with the power output stage, which is applicable to a single phase application, is disclosed in U.S. Pat. No. 5,463,874, entitled "Inductively Activated Control and Protection Circuit for Refrigeration Systems," issued Nov. 7, 1995, which is assigned to the assignee of the present invention, the disclosures of which are explicitly incorporated by reference. However, this inductively coupled control circuit cited above does not contain a current sensing circuit and so does not provide protection against the effect of lack of air flow over the condenser except by the sole means of a thermistor mounted on the compressor housing. A limitation of only using thermistor based protection is that the thermistor may become detached from the compressor housing.

Another inductively coupled control circuit, disclosed in copending U.S. Pat. No. 5,784,232, entitled "Multiple Winding Sensing Control and Protection Circuit for Electric Motors," which is assigned to the assignee of the present invention, the disclosures of which are explicitly incorporated by reference. This circuit provides a current detector circuit having a plurality of current detectors, each current detector associated with one of the motor windings and having a capacitor which provides a voltage level corresponding to the current in the respective winding. The output of the current detectors are combined to provide a combined current output to provide a combined current level signal. The combined current level signal is compared with a current threshold level to provide over current protection. The output of the current detectors are also connected to a single phase detector circuit and light load detector circuit which provide protection against single phase operation and light loading conditions, respectively. This circuitry also includes temperature detector circuits respectively associated with the compressor motor winding, selected compressor components and the interior of the chamber to be cooled. A low voltage detector circuit is also connected to the power supply voltage. However, this circuit does not address the thermostat functions, nor does the circuit address the relay function.

Therefore, what is needed is a control circuit for controlling a compressor motor which incorporates the thermostat and relay functions with protection features.

What is also needed is such control circuit for controlling a compressor motor which incorporates a number of protective features associated with abnormal power supply conditions.

What is also needed is such a control circuit which minimizes the required number of components to provide an inexpensive control and protection circuit in a compact, efficient package.

SUMMARY OF THE INVENTION

The present invention provides an integrated thermostat, relay, and motor protection circuit for a compressor. The system thermostat operates in conjunction with the motor protection function in order to prevent compressor restarting before pressure equalization. The circuit also provides a relay which is responsive to the motor starting. The motor protection aspect of the circuit senses the motor current, auxiliary winding voltage, winding temperature, compressor shell temperature, and line voltage.

In one aspect of the invention, the thermostat control masks the circuit's current limiting circuitry to allow for the higher compressor starting current. The overload timer limits the time period for an overload condition to about one second. The circuit limits the time duration of the excess current, but does not limit the magnitude of the current. The overload timer can be said to mask other circuit functions in that it overrides them and permits the overload condition to exist but only for the fixed time period.

In another aspect of the invention, the voltage detection circuitry shares a common reference voltage provided by precise solid state circuitry. The separate under and over voltage protection portions of the circuit provides protection of the compressor for the other condition even if one of the voltage protectors is subject to component failure. The over voltage protection circuit protects against excessively high line voltage, and will not apply voltage to the motor unless the line voltage is below the limit value.

In still another aspect of the invention, the control circuitry includes a run current limit check which guards against over current conditions. The run current limit circuitry also shares the common reference voltage, which provides precise solid state current comparisons.

Whenever the motor current exceeds the current limit for a period exceeding the time limit, a current trip will occur. This provides protection against the effects of lack of air flow over the condenser, as well as protection from burnout on locked rotor or other overload conditions. It would also be possible to include under current sensing circuitry.

A further aspect of the invention involves the power switching portion of the control including a solid state relay circuit, an optical coupler, and solid state power switches which enhance the reliability of the power switching arrangement. Solid state components such as SCRs form a switching circuit which switches the motor common circuit. A triac is employed as the power switching component of the solid state relay. The SCRs are triggered by a pilot-duty triac. The main terminal of the power switching triac is at the opposite side of the power line, so an optical coupler is used to drive the main terminal.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
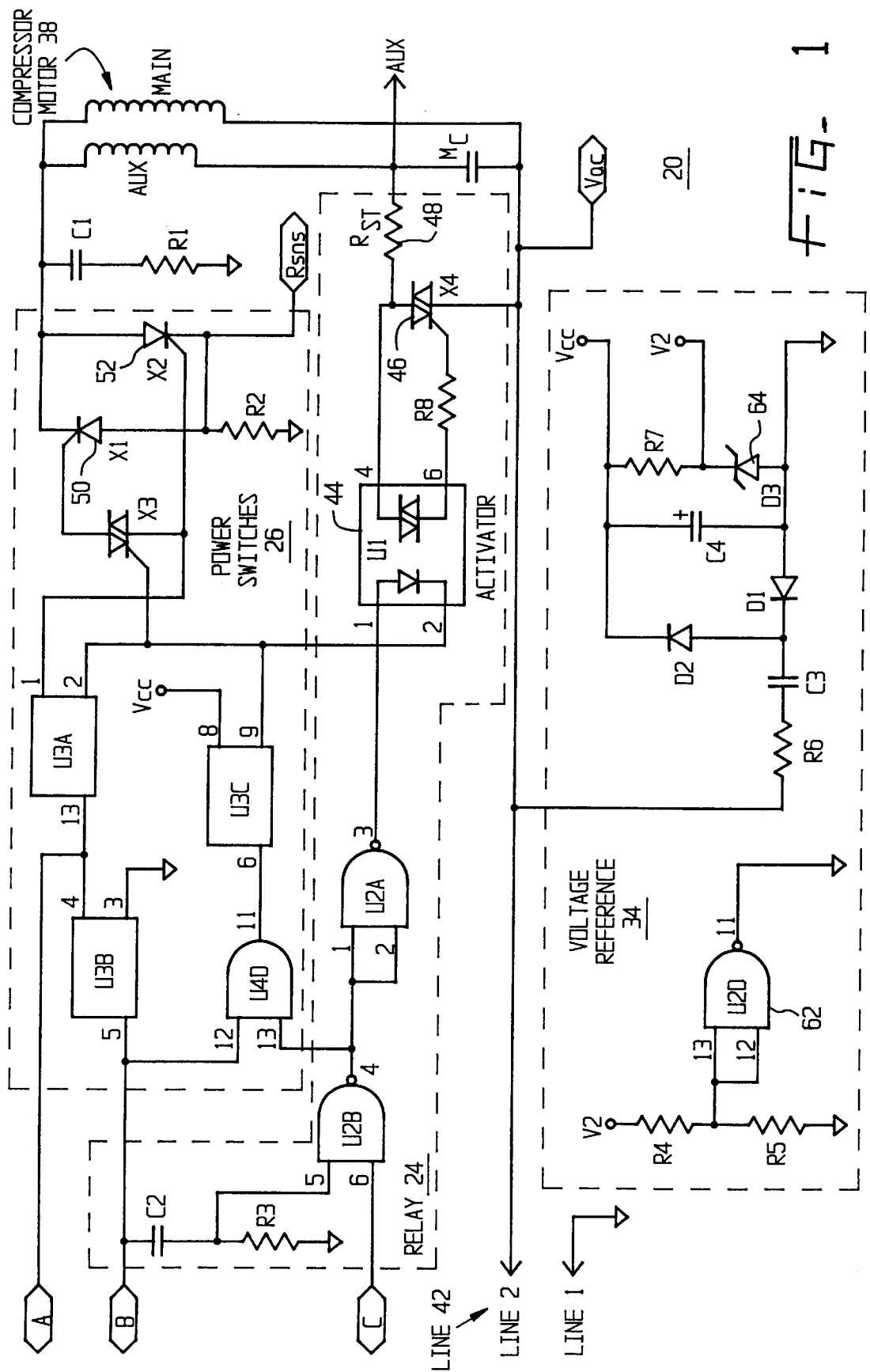
FIGS. 1 and 2 are schematic circuit diagram views of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

Figure 2:
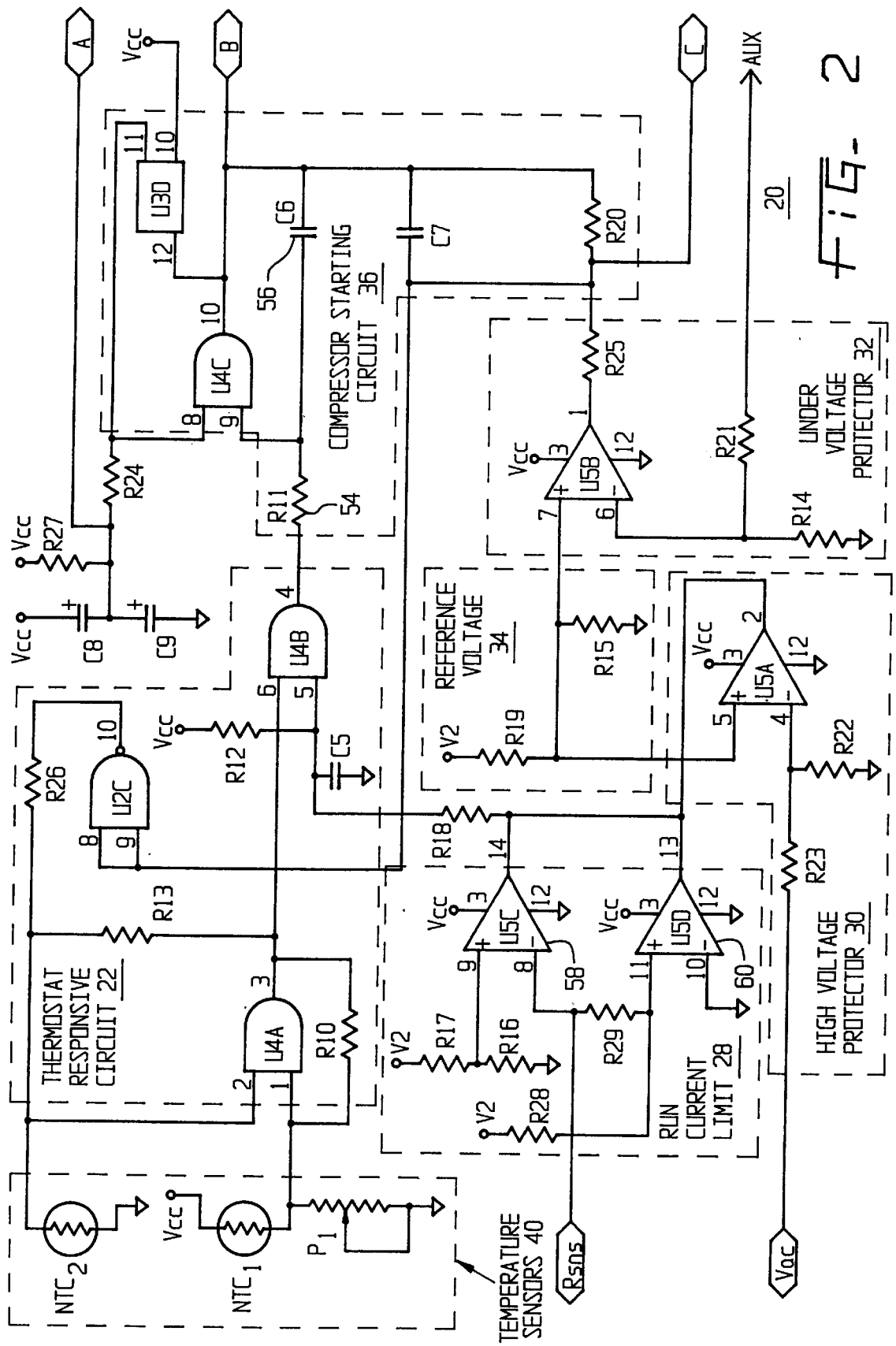

The schematic circuit diagrams of FIGS. 1 and 2 show on a component level the design of the present invention as embodied by thermostat control 20. Certain components have been associated into functional units and labeled within boxes to illustrate the general arrangement of the present invention.

Thermostat control 20 includes thermostat circuit 22 which is connected to temperature sensors 40, for example, negative temperature coefficient (NTC) thermistors.

The thermostat function is accomplished by $NTC_1$, thermostat potentiometer $P_1$, R10, and input pin #1 of U4A. A motor protection thermistor function is also provided by $NTC_2$, R26, R13, and input pin #2 of U4A. Thermostat responsive circuit 22 is coupled to relay 24 to activate and deactivate power switches 26. The power component of relay 24 is triac X4, while the power components of power switches 26 are SCRs X1 and X2.

Thermostat control 20 also includes motor protection circuitry in the form of run current limit circuit 28, high voltage protector 30, and under voltage protector 32. The motor protection circuitry shares voltage reference 34 which provides precise voltage and current reference values. Compressor starting circuit 36 masks the motor current protection circuitry to allow excessive current values during the compressor starting period, which time period is determined by the time constant of the circuit formed by R11 and C6.

Thermostat responsive circuit 22 includes AND gates U4A, U4B, NAND gate U2C, capacitor C5, and resistors R10, R12, R13, R18, R26. Thermostat responsive circuit 22 receives inputs from the temperature sensor, thermostat, run current limit circuit 28, high voltage protector circuit 30, and under voltage protector 32, and outputs through the compressor starting circuit 36. A motor trip will be generated by thermostat responsive circuit 22 when the compressor shell temperature is above the maximum level, the thermostat is above the set-point temperature, the run current exceeds its maximum limit, the line voltage exceeds its maximum limit, or the compressor voltage is too low.

Compressor starting circuit 36 includes AND gate U4C, bilateral switch U3D, capacitors C6, C7, C8, C9, and resistors R11, R20, R24, R27. Compressor starting circuit 36 receives inputs from thermostat responsive circuit 22, and outputs to relay circuit 24, power switch circuit 26, and thermostat responsive circuit 22. During compressor starting the output from thermostat responsive circuit 22 will be masked for about one second by compressor starting circuit 36.

Voltage reference circuit 34 includes NAND gate U2D, diodes D1, D2, Zener diode D3, capacitors C3, C4, and resistors R4, R5, R6, R7, R15, R19. The line voltage is the on input to the voltage reference circuit which outputs to all the other circuits. Voltage reference circuit 34 generates a supply voltage and a reference voltage. The NAND gate regulates the supply voltage allowing the Zener diode to serve as a precise reference for the reference voltage. Run current limit circuit 28, high voltage protector circuit 30, and under voltage protector 32 share this reference voltage.

Run current limit circuit 28 includes voltage comparators U5C, U5D, and resistors R16, R17, R28, R29. The inputs to run current limit circuit 28 are a voltage generated from the current through the compressor motor windings and the reference voltage. The output from run current limit circuit 28 connects to thermostat responsive circuit 22. Run current limit circuit 28 contains two voltage comparators, one for the positive part of the AC cycle and one for the negative part of the AC cycle. A trip will be sent to thermostat responsive circuit 22 when the current exceeds its maximum limit.

High voltage protector circuit 30 includes voltage comparator U5A, and resistors R22, R23. The reference voltage and the line voltage are inputs to high voltage protector circuit 30, and the output connects to thermostat responsive circuit 22. When the line voltage exceeds a maximum limit, a trip will be sent to thermostat control circuit 22.

Under voltage protector circuit 32 includes voltage comparator U5B, and resistors R14, R15, R25. The reference voltage and the voltage from the auxiliary winding of the compressor motor are inputs to under voltage protector circuit 32. If the voltage from the compressor is below its limit, a trip will be sent to thermostat control circuit 22.

Relay circuit 24 includes NAND gates U2A, U2B, optical coupler U1, triac X4, capacitor C2, and resistors R3, R8. Relay circuit 24 receives inputs from compressor starting circuit 36, under voltage protector circuit 32, and the line voltage. Outputs from relay circuit 24 connect to power switch circuit 26 and the compressor motor. Relay circuit 24 uses an optical coupler and triac to provide line voltage to the compressor motor through the start resistor and ensures the power switches are ON when the line voltage is present through the start resistor.

Power switch circuit 26 includes AND gate U4D, bilateral switches U3A, U3B, U3C, SCRs X1, X2, triac X3, and resistors R3, R8. Inputs to power switch circuit 26 are received from compressor starting circuit 26 and relay circuit 24. Outputs connect to the compressor motor and run current limit circuit 28. Power switch circuit 26 uses a pair of SCRs connected in parallel as a switch to allow current to flow through the compressor motor via the common input and provides a voltage proportional to the compressor current to run current limit circuit 28.

The present invention is illustrated by the following detailed description of its operation on a component level. For the conditions that the compressor shell temperature is below the maximum limit value, and that the power line voltage is below the maximum limit value, and that the thermostat has been in an off state for a time period exceeding the motor protector off-time period, and that the thermostat is then turned to or below the set-point temperature: the output of U4A goes to a high state, causing the output of U4B to go to a high state. After the elapse of a time period of about one second, as set by time constant R11C6, the input at pin 9 of U4C reaches the gate threshold voltage, causing the output at pin 10 to jump to a high state. Capacitor C2 forces input pin 5 of U2B to a high state, causing the output at pin 4 to drop low. Inverter stage U2A induces current in the LED of optical coupler U1, and in the gate of triac X3. This action turns on relay triac X4 and the main solid-state power switch formed by SCRs X1, X2 thereby connecting start resistor $R_{ST}$ from the aux terminal to LINE 2 of power line 42, and connecting the common terminal of compressor motor 38 to LINE 1 of power line 42.

For normal conditions, compressor 38 will start, and voltage at the AUX terminal will attain a relatively high value. This voltage is sensed by voltage divider R21, R14, and responded to by voltage comparator U5B, resulting in its output dropping low for a percentage of the AC cycle. Resistor R25 pulls the common connection of R20, C7, inputs of U2C, and input 6 of U2B to a low state. This action forces output pin 10 of U2C to a high state, thus continuing the drive to pin 2 of U4A. It also causes the output of U2B to jump to a high state unless it had already done so as a result of the time limit established by C2,R3. Output of U2B at a high state causes turn-off of relay triac X4 via U2A and U 1. Simultaneous with this turning off of the current in the LED of U1, this source of gate drive for X3 is interrupted; however, the action of the output U2B forcing pin 13 of U4D high causes its output to turn on U3C, thereby continuing the gate current drive to triac X3.

Concurrent with the event of the output of U4C going high, U3B discharges C9 and charges C8. Simultaneously, U3D latches input pin 8 of U4C to a high state. The state of charge on these capacitors will then not change until the output of U4C is returned to a low state, which in turn can occur only by the output of U4B going to a low state.

During compressor starting, motor current exceeds the maximum normal run current limit, and the outputs of U5C and U5D are each conductive for part of the AC cycle. Unless compressor starting exceeds the time interval as determined by time constant R11, C6, this turning on of U5C and U5D will not cause a motor protector current trip.

Prior to compressor starting, the output of U4C is at a low state. The inputs to U2C are connected to the output of U4C by R20 and C7, an arrangement which causes the output of U2C to be in a high state as required to initialize starting. In the running state, U5B must hold the inputs of U2C low for running to continue. This circuit function protects the motor against operation at too low a voltage, i.e., the circuit provides under voltage protection.

As described above, the circuit provides both over voltage protection and under voltage protection. This dual protection will give the advantage of protecting compressor 38 even in the event of a component failure in one of the two protective functions.

Protection against excessively-high line voltage is provided by U5A and voltage divider R23, R22, using the same reference voltage as was used for U5B.

The input to U3A, pin 13, is connected to the common point of C8, C9. This arrangement uses the protective diodes of U3A to limit the reverse voltages of C8 and C9 to a low value of about 0.5 volt when the main on/off mechanical switch is opened, or when the system experiences a failure of the power line input. A secondary function of U3A is to provide a gate-MT1 bypass resistor for X3 in the off-state.

U2D provides regulation of the $V_{CC}$ supply, allowing Zener D3 to operate at a low power level thereby preventing any significant self-heating in D3. This allows D3 to serve as a precision voltage reference for the current trip, high line voltage cut-out, under voltage, and relay function.

The illustrative embodiment of the invention depicted in FIGS. 1 and 2 has been implemented using the following components and values:

| Reference Label | Value or Component |
| --- | --- |
| C1 | 0.1µ, 400 v |
| C2 | 0.1µ |
| C3 | 0.68µ, 250 v |
| C4 | 470µ |
| C5 | 0.1µ |
| C6 | 0.1µ |
| C7 | 0.1µ |
| C8 | 10µ |
| C9 | 10µ |
| D1 | D1N4001 |
| D2 | D1N4001 |
| D3 | D1N5234 |
| R1 | 51 Ω |
| R2 | 0.0015 Ω |
| R3 | 8.2 MΩ |
| R4 | 3.3 MΩ |
| R5 | 10 MΩ |
| R6 | 150 Ω |
| R7 | 20 kΩ |
| R8 | 150 Ω |
| R9 | |
| R10 | 3.3 MΩ |
| R11 | 10 MΩ |
| R12 | 470 kΩ |
| R13 | 100 kΩ |
| R14 | 10 kΩ |

-continued

| Reference Label | Value or Component |
| --- | --- |
| R15 | 31.6 kΩ |
| R16 | 3.32 kΩ |
| R17 | 1 MΩ |
| R18 | 20 kΩ |
| R19 | 1 MΩ |
| R20 | 1 MΩ |
| R21 | 10 MΩ |
| R22 | 1 kΩ |
| R23 | 1 MΩ |
| R24 | 470 kΩ |
| R25 | 20 kΩ |
| R26 | 4.7 kΩ |
| R27 | 8.2 MΩ |
| R28 | 1 MΩ |
| R29 | 3.32 kΩ |
| U1 | MOC3052 |
| U2A, U2B, U2C, U2D | CD4011B |
| U3A, U3B, U3C, U3D | CD4016 |
| U4A, U4B, U4C, U4D | CD4081B |
| U5A, U5B, U5C, U5D | LM339 |
| X1 | MCR69-6 |
| X2 | MCR69-6 |
| X3 | MAC97A6 |
| X4 | MAC8D |

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A thermostat control circuit for a compressor comprising:
    thermostat responsive logic circuitry coupled to a temperature sensor associated with the compressor; and
    a solid state motor control circuit, said solid state motor control circuit including relay circuitry coupled to said thermostat responsive logic circuitry, power switch circuitry coupled to said relay circuitry for selectively providing current to the compressor, compressor starting circuitry with an overload timer coupled to said thermostat responsive logic circuitry, high voltage protection circuitry coupled to said thermostat responsive logic circuitry to prevent the compressor from operating at excessive input line voltages, under voltage protection circuitry coupled to said thermostat responsive logic circuitry to prevent the compressor from operating at an excessively low voltage, and run current limiting circuitry coupled to said thermostat responsive logic circuitry to prevent the compressor from operating with excessive current.

2. The thermostat control circuit of claim 1 wherein said relay circuitry includes an optical coupler and triac coupled to the compressor to provide line voltage to the compressor through a start resistor.

3. The thermostat control circuit of claim 1 wherein said power switch circuitry includes a pair of SCRs connected in parallel in relation to the compressor as a switch to allow current to flow through the compressor.

4. The thermostat control circuit of claim 1 wherein said overload timer comprises a resistor and capacitor which masks said run current limiting circuitry during the compressor starting period for about one second.

5. The thermostat control circuit of claim 1 wherein said run current limiting circuitry includes two voltage comparators arranged in parallel in relation to the compressor to monitor positive and negative parts of AC current through the compressor.

6. The thermostat control circuit of claim 1 further comprising voltage reference circuitry providing a supply voltage and a reference voltage coupled to said thermostat responsive logic circuit and said solid state motor control circuit.

7. The thermostat control circuit of claim 6 wherein said voltage reference circuitry includes a NAND gate coupled to said supply voltage which regulates said supply voltage.

8. The thermostat control circuit of claim 7 wherein said voltage reference circuitry includes a Zener diode.

9. The thermostat control circuit of claim 6 wherein said high voltage protection circuitry and said under voltage protection circuitry share said reference voltage.

10. The thermostat control circuit of claim 9 wherein said run current limiting circuitry shares said reference voltage with said high voltage protection circuitry and said under voltage protection circuitry.

11. A refrigeration system comprising:
    electrical compressor motor;
    a line adapted to be connected to an electrical power line;
    thermostat control circuit coupling said compressor motor with said line comprising:
        thermostat responsive logic circuitry coupled to a temperature sensor associated with the compressor; and
        a solid state motor control circuit, said solid state motor control circuit including relay circuitry coupled to said thermostat responsive logic circuitry, power switch circuitry coupled to said relay circuitry for selectively providing current to the compressor, compressor starting circuitry with an overload timer coupled to said thermostat responsive logic circuitry, high voltage protection circuitry coupled to said thermostat responsive logic circuitry to prevent the compressor from operating at excessive input line voltages, under voltage protection circuitry coupled to said thermostat responsive logic circuitry to prevent the compressor from operating at an excessively low voltage, and run current limiting circuitry coupled to said thermostat responsive logic circuitry to prevent the compressor from operating with excessive current.

12. The refrigeration system of claim 11 wherein said solid state relay circuitry includes an optical coupler and triac coupled to the compressor to provide line voltage to the compressor through a start resistor.

13. The refrigeration system of claim 11 wherein said solid state power switch circuitry includes a pair of SCRs connected in parallel in relation to the compressor as a switch to allow current to flow through the compressor.

14. The refrigeration system of claim 11 wherein said overload timer comprises a resistor and capacitor which masks said run current limiting circuitry during the compressor starting period for about one second.

15. The refrigeration system of claim 11 wherein said run current limiting circuitry includes two voltage comparators arranged in parallel in relation to the compressor to monitor positive and negative parts of AC current through the compressor.

16. The refrigeration system of claim 11 further comprising voltage reference circuitry providing a supply voltage and a reference voltage coupled to said thermostat responsive logic circuitry and said solid state motor control circuit.

17. The refrigeration system of claim 16 wherein said voltage reference circuitry includes a NAND gate coupled to said supply voltage which regulates said supply voltage.

18. The refrigeration system of claim 17 wherein said voltage reference circuitry includes a Zener diode.

19. The refrigeration system of claim 16 wherein said high voltage protection circuitry and said under voltage protection circuitry share said reference voltage.

20. The refrigeration system of claim 19 wherein said run current limiting circuitry shares said reference voltage with said high voltage protection circuitry and said under voltage protection circuitry.

* * * * *